United States Patent Office.

EDGAR E. ELLIS, OF ROCHESTER, NEW YORK, ASSIGNOR OF ONE-HALF TO AUGUST L. LEHNKERING, OF SAME PLACE.

PHOTOGRAPHIC FILM.

SPECIFICATION forming part of Letters Patent No. 385,797, dated July 10, 1888.

Application filed July 1, 1886. Serial No. 206,850. (No specimens.)

*To all whom it may concern:*

Be it known that I, EDGAR E. ELLIS, of the city of Rochester, in the county of Monroe and State of New York, have invented a certain new and useful Improvement in Photographic Films; and I do hereby declare that the following is a full, clear, and exact description of the same.

My improvement relates to films to take the place of glass in making photographic negatives, and is designed for dry use, and to be of that flexible and pliable nature that it can be wound on rolls and manipulated like paper films now in use. The design is to produce a film of the above-named character which is more effective than paper films, and which in these peculiar qualities resembles glass.

In the manufacture of my improved film gun-cotton cut or dissolved in alcohol and ether forms the basis, and with this is combined some resinous gum—such as Canada balsam or Venetian turpentine—gum-camphor, and india-rubber cut or dissolved in benzole, the whole being mixed together to form a compound that is thin enough to spread on a glass surface, but will form a smooth and perfect film when dried.

The proportions are as follows: gun-cotton dissolved in alcohol and ether, one ounce; resinous gum, one-third ounce; gum-camphor, one-third ounce; india-rubber dissolved in benzole, one-third ounce. These proportions may be slightly varied, more or less, as necessity requires.

To prepare the film, the compound above described is dropped on a glass plate, and it spreads of its own action equally over the whole surface, and when dry it is stripped from the plate and forms a sheet or web similar to paper, but transparent like glass. It is flexible, pliable, and tough, and retains these qualities, and when made in considerable length it can be rolled up on rolls like paper films and be used in the same way, but is far more effective in use, as it is transparent like glass.

The glass bed on which the compound is spread should have raised edges to prevent the liquid running off, and also a closed top or cover to prevent too rapid evaporation, said cover to have holes through which to pour the liquid and said holes covered by slides.

This film differs from those made from collodion and provided with a backing of gelatine, and which resemble glass plates, inasmuch as resinous gum is incorporated with the gun-cotton and gives sufficient body, so that the film can be built up solid, having uniform texture and transparency, and, moreover, rendering the film so pliable that it can be wound on rollers like paper. This gum not only gives the requisite body, but it also makes the film water-proof. The rubber gives tenacity, strength, and pliability. The gum-camphor assists in clarifying and clearing the compound. The resinous gum is essential to produce a transparent texture, as well as to give body, as the gun-cotton alone, when dried, is yellow and opaque, and is so brittle that it cannot be bent or rolled.

The film above described is prepared with the sensitive coating in the same manner as ordinary negatives.

Having described my invention, what I claim as new, and desire to secure by Letters Patent, is—

As a new article of manufacture, a photographic film composed of gun-cotton dissolved in alcohol and ether, resinous gum, gum-camphor, and rubber dissolved in benzole, in proportions substantially as set forth.

In witness whereof I have hereunto signed my name in the presence of two subscribing witnesses.

E. E. ELLIS.

Witnesses:
R. F. OSGOOD,
JACOB SPAHN.